United States Patent [19]
Aoki et al.

[11] Patent Number: 5,720,608
[45] Date of Patent: Feb. 24, 1998

[54] COMBUSTING APPARATUS WITH STORAGE BATTERY INCLUDED THEREIN

[75] Inventors: Yutaka Aoki, Sappro; Yuzuru Watanabe, Sapporo; Koichi Mitsufuji, Otaru, all of Japan

[73] Assignee: Paloma Kogyo Kabushiki Kaisha, Nagoya, Japan

[21] Appl. No.: 606,016

[22] Filed: Feb. 12, 1996

[30] Foreign Application Priority Data

Feb. 17, 1995 [JP] Japan .................. 7-053316

[51] Int. Cl.[6] .................................... F23N 5/10
[52] U.S. Cl. ................. 431/80; 431/78; 126/39 BA
[58] Field of Search ................. 431/18, 78, 64, 431/42, 80; 126/39 BA, 39 E, 39 G, 39 N; 320/2, 21

[56] References Cited

U.S. PATENT DOCUMENTS

| | | | |
|---|---|---|---|
| 4,565,519 | 1/1986 | Carignan | 431/80 |
| 4,770,629 | 9/1988 | Bohan, Jr. | 431/80 |
| 4,984,981 | 1/1991 | Pottebaum | 431/80 |

FOREIGN PATENT DOCUMENTS

| | | |
|---|---|---|
| 60-60422 | 4/1985 | Japan . |
| 62-29827 | 2/1987 | Japan . |

Primary Examiner—James C. Yeung
Attorney, Agent, or Firm—Lahive & Cockfield, LLP

[57] ABSTRACT

A combusting apparatus of the present invention can easily recharge an incorporated storage battery that has been exhausted to or below a required minimum level. A burner (18) in the combusting apparatus is further provided with a thermoelectricity generating element (4), which receives the heat of combustion and generates a thermoelectric e.m.f. When a multi-contact switch (16) is activated to set the arrangement of plural capacitors (15) in parallel, the capacitors (15) having the parallel configuration are charged with a thermoelectric e.m.f. generated by the thermoelectricity generating element (4). When an operation of a switching button (20) activates the multi-contact switch (16) to change the arrangement of the capacitors (15) from the parallel configuration to the series configuration, the sum of the voltages of the capacitors (15) is applied to an oscillation circuit (9) included in a booster circuit (8) as well as a storage battery (12). The booster circuit (8) is then activated to boost the thermoelectric e.m.f. generated by the thermoelectricity generating element (4) and start applying the boosted voltage to the storage battery (12). This enables the exhausted storage battery (12) to be efficiently recharged with the power supplied from the capacitors (15) and the booster circuit (8).

7 Claims, 4 Drawing Sheets

COMBUSTING APPARATUS WITH STORAGE BATTERY INCLUDED THEREIN

BACKGROUND OF THE INVENTION

1. Field of the Invention

The present invention relates to a combusting apparatus having an incorporated storage battery, and more specifically to a combusting apparatus, which utilizes a heat of combustion to recharge an incorporated storage battery and activates electrical loads, such as an igniter, with the power stored in the storage battery.

2. Description of the Related Art

Known combusting apparatus, which operate electrical loads by utilizing heat of combustion generated by a burner, include a thermoelectricity generating element as a power source as well as a storage battery charged with a thermoelectric electromotive force generated by the thermoelectricity generating element.

FIGS. 4A and 4B schematically illustrate a conventional combusting apparatus having an incorporated storage battery. The illustrated combusting apparatus is constructed as a cooker utilizing heat of combustion generated by a burner 118. The combusting apparatus includes a thermoelectricity generating element 104 for generating a thermoelectric electromotive force (e.m.f.), a booster circuit 108 for boosting the voltage of the thermoelectric e.m.f., and a storage battery 112 charged with the boosted voltage.

At the beginning of combustion, an igniter 114 is activated with the power stored in the storage battery 112 and supplies electricity to the burner 118 to ignite a mixture of gaseous fuel and air. The storage battery 112 is charged with the thermoelectric e.m.f. generated by the thermoelectricity generating element 104. The igniter 114 is driven by the power stored in the storage battery 112.

In the conventional combusting apparatus described above, the storage battery 112 exhausted to or below a required minimum level should be replaced with a new storage battery or recharged by an external means. The thermoelectric e.m.f. generated by the thermoelectricity generating element 104 is too low to be directly applied to the storage battery 112. The booster circuit 108 included in the combusting apparatus thus boosts the power of the thermoelectric e.m.f. to a rechargeable level, and the storage battery 112 is recharged with the boosted voltage.

The booster circuit 108 is, however, activated by the power of the storage battery 112. When the storage battery 112 is exhausted to or below the required minimum level and can not activate the booster circuit 108, the storage battery 112 can not be recharged any longer.

The required minimum level of the storage battery 112 allowing the recharge is, for example, 1.2 V for a nickel-cadmium accumulator. At least the voltage of 0.6 to 2.0 V is required to activate electrical loads, such as the igniter 114 and other operation lamps. The thermoelectric e.m.f. generated by the thermoelectricity generating element 104 is, on the other hand, approximately 0.4 V.

As discussed above, the storage battery 112 can not be recharged directly with the low thermoelectric e.m.f. generated by the thermoelectricity generating element 104. When the voltage of the storage battery 112 excessively decreases to the level which can not activate the booster circuit 108, the storage battery 112 can not be recharged any longer.

The power of the storage battery 112 is decreased by self-discharge to or below the required minimum level, for example, when the combusting apparatus has not been used for a long time. In this case, the exhausted storage battery 112 should be replaced with a new one or recharged by some external means. The combusting apparatus may be provided with a back-up power source for making up for the decreased power of the storage battery 112, although the back-up power source is also exhausted by the self-discharge.

SUMMARY OF THE INVENTION

The object of the present invention is thus to provide a combusting apparatus which can easily recharge an incorporated storage battery that has been exhausted to or below a required minimum level.

The above and the other related objects are realized by a combusting apparatus having an incorporated storage battery. The combusting apparatus of the invention includes a burner for burning a mixture of gaseous fuel and air to generate a heat of combustion, a thermoelectricity generating element for receiving the heat of combustion generated by the burner and generating a thermoelectric electromotive force as a power, booster means for receiving the power generated by the thermoelectricity generating element, boosting the power, and supplying the boosted power to the storage battery, the booster means receiving an electric power directly from the storage battery at least in the beginning of combustion, the storage battery being recharged with the boosted power supplied from the booster means, and combustion starting means for utilizing the power stored in the storage battery to ignite the mixture of gaseous fuel and air and start combustion of the air/fuel mixture, the combusting apparatus further including a plurality of capacitors whose arrangement is changed between a parallel configuration and a series configuration, and switching means for switching the arrangement of the plurality of capacitors from the parallel configuration to the series configuration or vice versa, wherein the plurality of capacitors arranged in parallel store the power supplied from the thermoelectricity generating element, the plurality of capacitors applying a sum of voltages of the capacitors as an electric power to the booster means when the switching means switches the arrangement of the plurality of capacitors to the series configuration.

In the combusting apparatus of the invention thus constructed, the plurality of capacitors arranged in parallel are charged the power supplied from the thermoelectricity generating element. When the switching means switches the arrangement of the plurality of capacitors from the parallel configuration to the series configuration, the sum of the voltages of the capacitors arranged in series is applied to the booster means. The booster means is activated by the power applied from the capacitors and boosts the thermoelectric electromotive force generated by the thermoelectricity generating element. The storage battery is recharged with the boosted power supplied from the booster means.

The structure of the invention does not require replacement of the exhausted storage battery but can effectively recharge the exhausted storage battery.

In accordance with one preferred application, the booster means further includes oscillation means for receiving an electric power from the storage battery at least in the beginning of combustion. The oscillation means further receives the sum of voltages applied from the plurality of capacitors when the switching means switches the arrangement of the plurality of capacitors to the series configuration. The booster means is activated to boost the thermoelectric electromotive force generated by the thermoelectricity generating element when the oscillation means receives the sum of voltages from the plurality of capacitors arranged in series. The plurality of capacitors arranged in series also apply the sum of voltages as a charging power to the storage battery.

These and other objects, features, aspects, and advantages of the present invention will become more apparent from the following detailed description of the preferred embodiment with the accompanying drawings.

DESCRIPTION OF THE PREFERRED EMBODIMENT

Figure 1A:
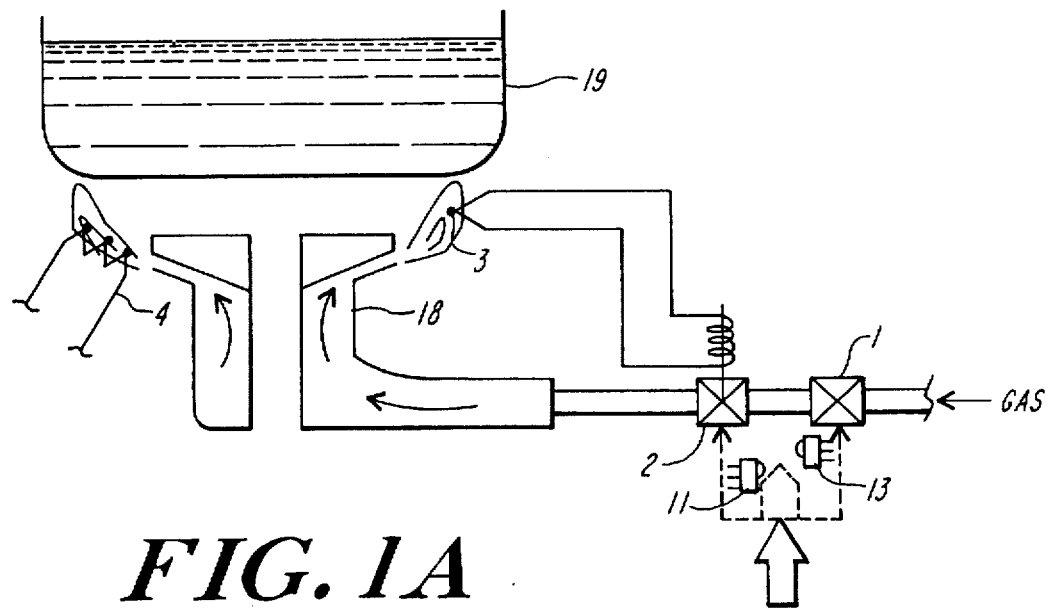
FIGS. 1A and 1B schematically illustrate a combusting apparatus having an incorporated storage battery as a preferred embodiment of the present invention.
Figure 1B:
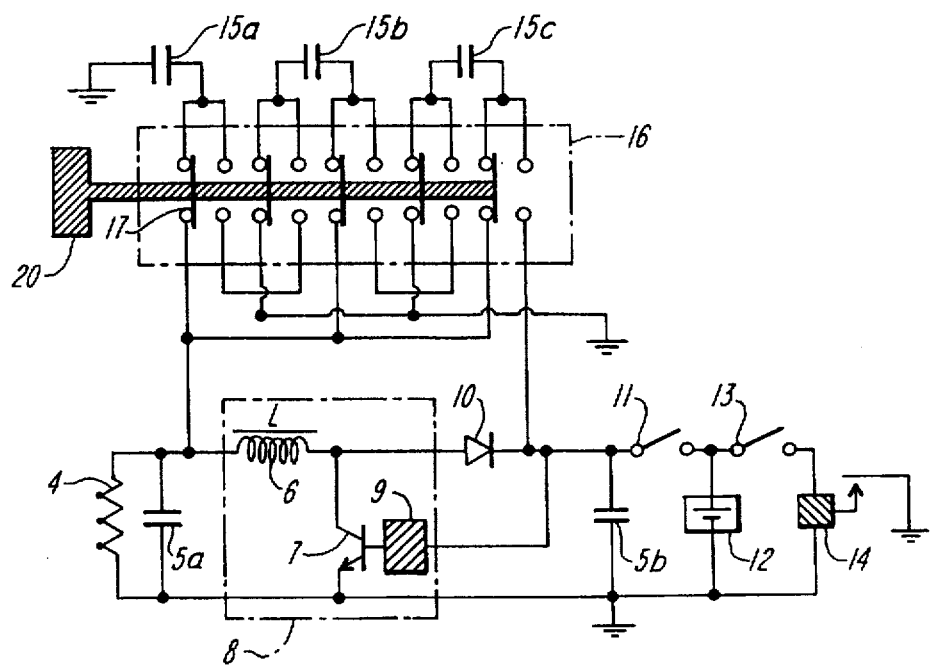

FIGS. 1A and 1B schematically illustrate a cooker embodying the present invention. The cooker includes a burner 18 for burning a mixture of gaseous fuel and air and a cooking pot 19 disposed above the burner 18 to be heated by the combustion flame of the air/fuel mixture. The burner 18 is provided with a thermocouple 3 for receiving the heat of the combustion flame and generating a thermoelectric e.m.f. (electromotive force).

There is a stopcock 1 disposed before the burner 18 in a gas flow path for feeding a supply of gaseous fuel to the burner 18. The stopcock 1 opens the gas flow path in response to a pressing operation and closes the gas flow path in response to a next pressing operation. A magnet safety valve 2 disposed after the stopcock 1 in the gas flow path forcibly opens the gas flow path in response to a pressing operation and keeps the open position of the gas flow path by the thermoelectric e.m.f. generated by the thermocouple 3. The thermocouple 3 and the magnet safety valve 2 are electrically connected to a closed circuit. When the combustion flame accidentally goes out and the thermoelectric e.m.f. of the thermocouple 3 is lowered, the electromagnetic force of the magnet safety valve 2 is reduced to close the gas flow path. These elements constitute a safety device against the accidental go-out of the flame.

The burner 18 is further provided with a thermoelectricity generating element 4 for receiving the heat of combustion and generating a thermoelectric e.m.f. The thermoelectricity generating element 4 is connected to a smoothing capacitor 5a in a parallel configuration and further connected with a booster circuit 8 via the capacitor 5a. The booster circuit 8 for boosting the thermoelectric e.m.f. includes an oscillation circuit 9 for generating an oscillating signal, a transistor 7 for switching on and off in response to the oscillating signal, and a coil 6 for increasing the output voltage of the thermoelectricity generating element 4 in response to the switching operation. In a preferable application, the thermoelectricity generating element 4 consists of a plurality of thermocouples connected in series to give a high output voltage.

A diode 10 is connected to the secondary side of the booster circuit 8. A storage battery 12 is connected in parallel to the smoothing capacitor 5b via a charging switch 11, which is turned ON at the time of ignition in response to the pressing operation for opening the stopcock 1 and the magnet safety valve 2.

The oscillation circuit 9 included in the booster circuit 8 is connected to the storage battery 12 via the charging switch 11 and receives a power required for oscillation from the storage battery 12. The charging switch 11, which is on and off in linkage with the pressing operation, is kept ON during the combustion and turned OFF when the combustion flame goes out. The charging switch 11 set in ON position during the combustion electrically connects the booster circuit 8 with the storage battery 12. An ignition switch 13 is disposed between the storage battery 12 and an igniter 14 for supplying electricity to the burner 18 to ignite the air/fuel mixture. The ignition switch 13 is turned ON in response to the pressing operation for opening the magnet safety valve 2 and automatically turned OFF after the pressing operation.

Figure 2A:
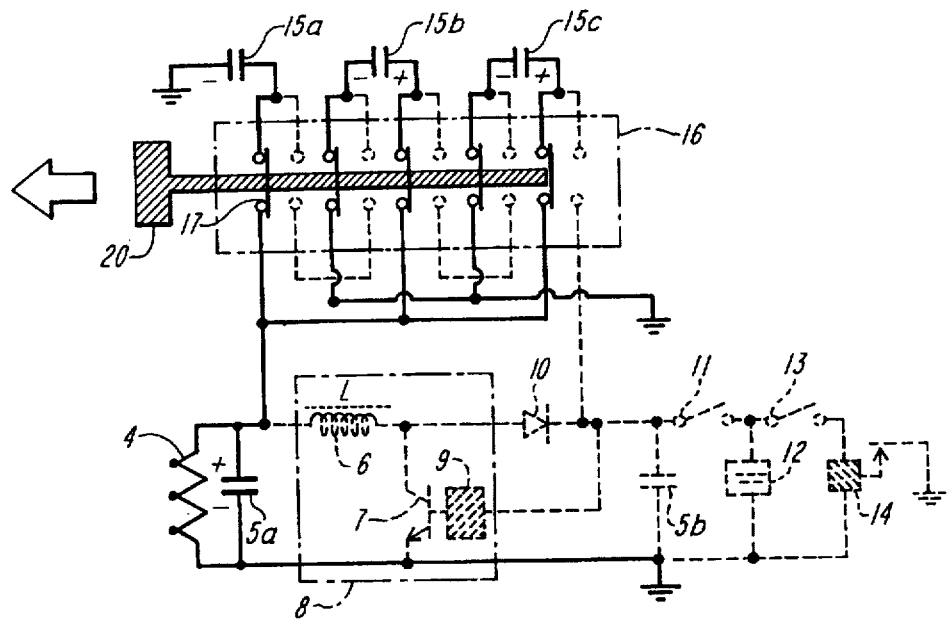
FIGS. 2A and 2B schematically illustrate capacitors 15 arranged in parallel and in series.

The cooker is further provided with a switching button 20 working independently of the above elements linked with the pressing operation for opening the stopcock 1 and the magnet safety valve 2. The switching button 20 is linked with a multi-contact switch 16 having a plurality of contacts 17. A pressing operation of the switching button 20 simultaneously switches the plurality of contacts 17 in the multi-contact switch 16. The multi-contact switch 16 is connected to a plurality of capacitors 15a, 15b, and 15c (hereinafter may be referred to in general as the capacitors 15). The capacitors 15 store the charge output from the thermoelectricity generating element 4. Every switching operation of the switching button 20 changes the arrangement of the capacitors 15 in parallel to that in series or vice versa as shown in FIGS. 2A and 2B.

The arrangement of the capacitors 15 changed through the switching operation of the multi-contact switch 16 sets either the charging position for charging the capacitors 15 or the discharging position for discharging the capacitors 15. When the switching button 20 is operated to set the arrangement of the capacitors 15 in parallel, the thermoelectricity generating element 4 connects with the respective capacitors 15 arranged in parallel as shown in FIG. 2A. The capacitors 15 are accordingly charged with the thermoelectric e.m.f. generated by the thermoelectricity generating element 4. In this state, the voltage of each capacitor 15 is identical with the voltage of the thermoelectricity generating element 4.

Figure 2B:
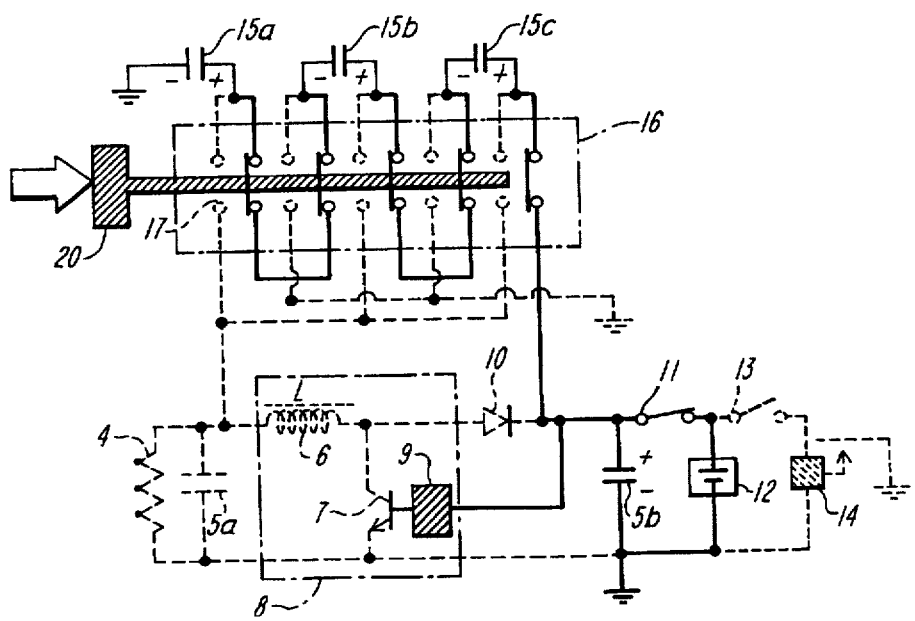

When the switching button 20 is operated to set the arrangement of the capacitors 15 in series, on the other hand, the storage battery 12 connects with the respective capacitors 15 arranged in series as shown in FIG. 2B. The sum of the voltages of the capacitors 15 is accordingly applied to the storage battery 12.

When the thermoelectricity generating element 4 generates a thermoelectric e.m.f. of 0.4 V, for example, the voltage of 0.4 V is applied from the thermoelectricity generating element 4 to the terminals of the capacitors 15a, 15b, and 15c arranged in parallel. When the arrangement of the capacitors 15 is changed to the series configuration, the sum of the voltages of the three capacitors 15a, 15b, and 15c, that is, the voltage of 1.2 V (=0.4 V ×3), is applied to the storage battery 12.

Referring to FIG. 1, operation of each element is described according to the ignition and combustion process of the cooker. A pressing operation of an ignition button (not shown) opens the stopcock 1 and the magnet safety valve 2 to open the gas flow path. The ignition switch 13 set in the ON position enables the power to be supplied from the storage battery 12 to the igniter 14. The burner 18 receives electricity supplied from the igniter 14 and starts ignition and combustion of the air/fuel mixture.

The thermocouple 3 mounted on the burner 18 receives the heat of combustion and generates a thermoelectric e.m.f., while an electromagnet (not shown) of the magnet safety valve 2 generates an electromagnetic force. The magnet safety valve 2 is kept open by the electromagnetic force until the combustion flame goes out.

The thermoelectricity generating element 4 is heated by the combustion flame and generates a thermoelectric e.m.f. The storage battery 12 supplies the power to the oscillation circuit 9 included in the booster circuit 8, and the thermoelectric e.m.f. generated by the thermoelectricity generating element 4 is increased by the coil 6 in response to the switching operation of the transistor 7 arranged in the booster circuit 8. The thermoelectric e.m.f. boosted by the booster circuit 8 is eventually applied to the storage battery 12.

When the storage battery 12 is exhausted to or below a required minimum level, sufficient power is not supplied to the igniter 14, which thereby can not ignite the air/fuel mixture.

Under such conditions, after the gas flow path is opened through a pressing operation, the air/fuel mixture is ignited with a match to start combustion on the burner 18. For some time after the start of combustion, the capacitors 15 are kept in parallel as shown in FIG. 2A. This enables the respective capacitors 15a, 15b, and 15c to be charged with the thermoelectric e.m.f. generated by the thermoelectricity generating element 4.

After the capacitors 15 are sufficiently charged, the switching button 20 is operated to switch the multi-contact switch 16 and change the arrangement of the capacitors 5 from the parallel configuration to the series configuration shown in FIG. 2B. The capacitors 5, which connect with the thermoelectricity generating element 4 in the parallel configuration, are connected to the storage battery 12, and the sum of the voltages of the capacitors 15 is applied as the charging power to the storage battery 12.

At the same time, the charging power is supplied to the booster circuit 8 to activate the oscillation circuit 9 included in the booster circuit 8. The storage battery 12 is then recharged with the thermoelectric e.m.f. generated by the thermoelectricity generating element 4 and boosted by the booster circuit 8.

Figure 3:
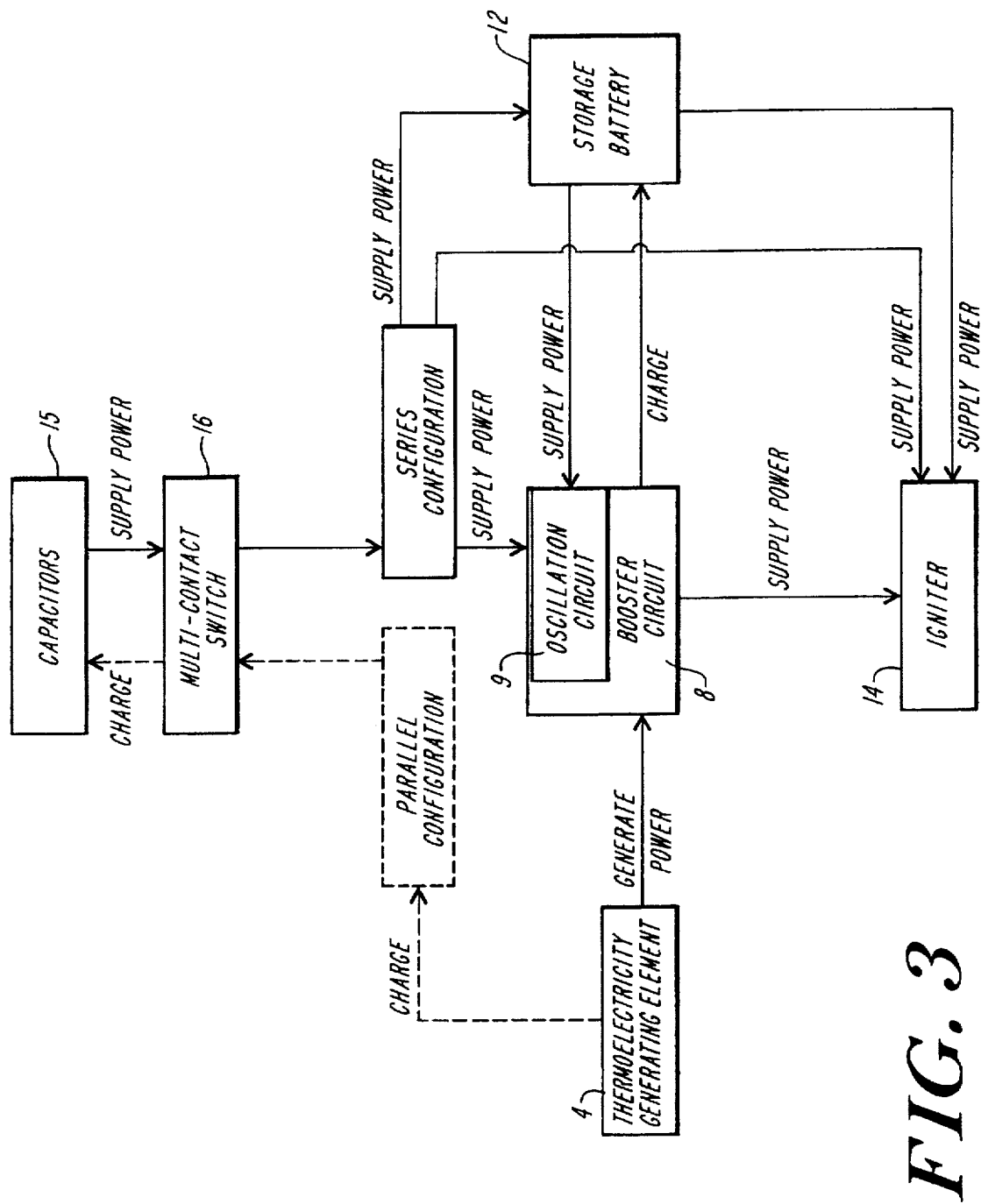
FIG. 3 is a block diagram showing the operation principle of the embodiment.
Figure 4A:
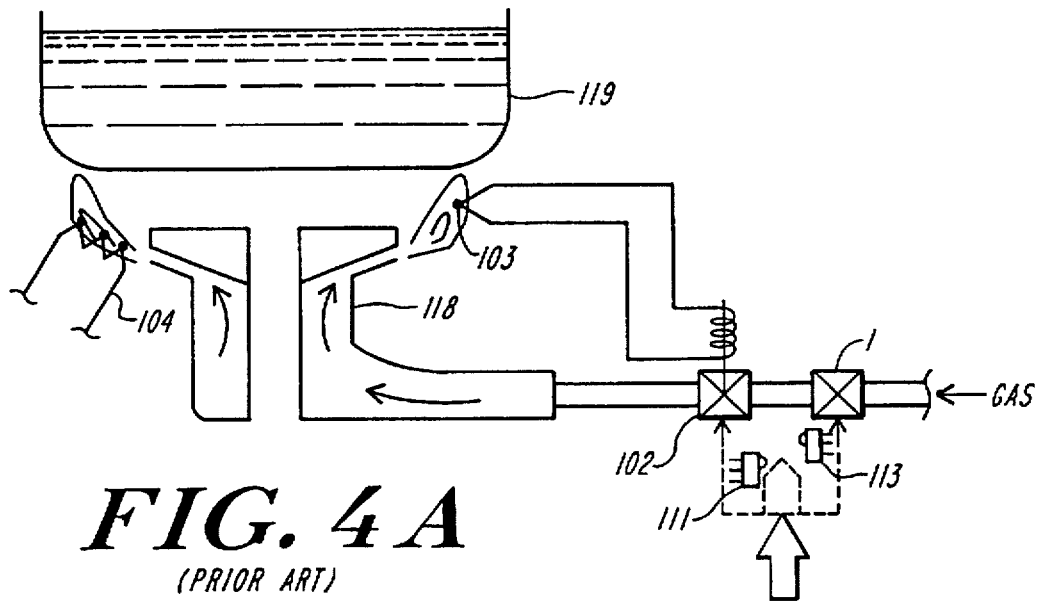
FIGS. 4A and 4B schematically illustrate a conventional combusting apparatus having an incorporated storage battery.
Figure 4B:
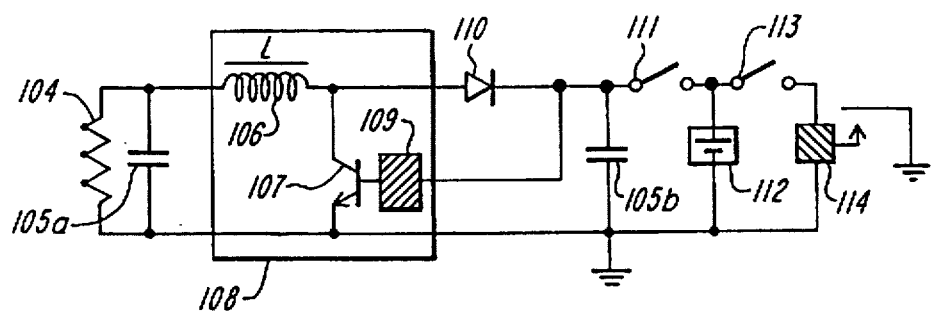

FIG. 3 is a block diagram showing the operation principle of this embodiment. The broken line in FIG. 3 represents the process of charging the capacitors 15 having the parallel configuration. When the arrangement of the capacitors 15 is changed from the parallel configuration to the series configuration, the power stored in the capacitors 15 is supplied to the oscillation circuit 9 and the storage battery 12 (and further to other loads, such as the igniter 14, according to the requirements) as shown by the thick solid line in FIG. 3. The oscillation circuit 9 is activated by the power stored in the capacitors 15, so that the booster circuit 8 is activated to boost the thermoelectric e.m.f. generated by the thermoelectricity generating element 4 and start applying the boosted voltage to the storage battery 12.

This enables the exhausted storage battery 12 to be efficiently recharged with the power supplied from the capacitors 15 and the booster circuit 8. The storage battery 12 can be recharged according to the simple operation discussed above and thus does not require any specific maintenance. The energy-saving system of the embodiment converts part of the heat of combustion to electrical energy and utilizes the energy for recharging the storage battery 12.

There may be many modifications, alternations, and changes without departing from the scope or spirit of essential characteristics of the invention. It is thus clearly understood that the above embodiment is only illustrative and not restrictive in any sense. Some examples of modification are given below.

The principle of the present invention is applicable to other gas-powered appliances not using the commercial power source, such as rice cookers, ovens, stoves, and water heaters, other than the cooker described in the above embodiment. Although three capacitors 15a, 15b, and 15c are incorporated in the system of the embodiment, the system may include 2 or any greater number of capacitors. In the structure of the embodiment, the multi-contact switch 16 sets the arrangement of the capacitors 15 in series to enable the power to be supplied to the storage battery 12 and the oscillation circuit 9. The power may be supplied simultaneously to other loads, such as an igniter, a magnet, and LEDs (light-emitting diodes).

In the embodiment, the air/fuel mixture is ignited with a match when the storage battery 12 is exhausted to or below a required minimum level. Another preferable structure includes a piezoelectric igniter, which does not require any external power for ignition. In this modified structure, the gas flow path is opened and the piezoelectric igniter is activated to ignite the air/fuel mixture, in linkage with the switching operation of the switching button 20 to arrange the capacitors 15 in parallel configuration.

In another modified structure, a plurality of switches may be used in place of the multi-contact switch 16 of the above embodiment to change the arrangement of the capacitors 15 between the parallel configuration and the series configuration. This modified structure requires a lock mechanism to prevent two switches from being simultaneously switched ON to realize the parallel configuration concurrently with the series configuration. This results in a short-circuit and loses the power stored in the capacitors.

The scope and spirit of the present invention are limited only by the terms of the appended claims.

What is claimed is:

1. A combusting apparatus having an incorporated storage battery, said combusting apparatus comprising a burner for burning a mixture of gaseous fuel and air to generate a heat of combustion, a thermoelectricity generating element for receiving the heat of combustion generated by said burner and generating a thermoelectric electromotive force as a power, booster means for receiving the power generated by said thermoelectricity generating element, boosting the power, and supplying the boosted power to said storage battery, said booster means receiving an electric power directly from said storage battery at least in the beginning of combustion, said storage battery being recharged with the boosted power supplied from said booster means, and combustion starting means for utilizing the power stored in said storage battery to ignite the mixture of gaseous fuel and air and start combustion of the air/fuel mixture, said combusting apparatus further comprising a plurality of capacitors whose arrangement is changed between a parallel configuration and a series configuration, and switching means for switching the arrangement of said plurality of capacitors from the parallel configuration to the series configuration or vice versa, wherein said plurality of capacitors arranged in parallel store the power supplied from said thermoelectricity generating element, said plurality of capacitors applying a sum of voltages of said capacitors as an electric power to said booster means when said switching means switches the arrangement of said plurality of capacitors to the series configuration.

2. A combusting apparatus in accordance with claim 1, wherein said booster means further comprises oscillation means for receiving an electric power from said storage battery at least in the beginning of combustion.

3. A combusting apparatus in accordance with claim 2, wherein said oscillation means further receives the sum of voltages applied from said plurality of capacitors when said switching means switches the arrangement of said plurality of capacitors to the series configuration.

4. A combusting apparatus in accordance with claim 1, wherein said plurality of capacitors arranged in series apply the sum of voltages as a charging power to said storage battery.

5. A combusting apparatus in accordance with claim 2, wherein said booster means is activated to boost the thermoelectric electromotive force generated by said thermoelectricity generating element when said oscillation means receives the sum of voltages from said plurality of capacitors arranged in series.

6. A combusting apparatus in accordance with claim 1, wherein said combustion starting means comprises an igniter.

7. A combusting apparatus in accordance with claim 1, wherein said switching means comprises a multi-contact switch.

\* \* \* \* \*